(12) United States Patent
Kassianoff

(10) Patent No.: US 7,562,493 B2
(45) Date of Patent: Jul. 21, 2009

(54) TENSIONED INFLATABLE COVER MODULE

(76) Inventor: Edouard Pichko Kassianoff, 108 Falton Way NE, Calgary (CA) T3J 1K5

( * ) Notice: Subject to any disclaimer, the term of this patent is extended or adjusted under 35 U.S.C. 154(b) by 662 days.

(21) Appl. No.: 11/114,774

(22) Filed: Apr. 27, 2005

(65) Prior Publication Data

US 2006/0059788 A1    Mar. 23, 2006

(30) Foreign Application Priority Data

Sep. 1, 2004   (CA) .................................. 2477797

(51) Int. Cl.
*E04G 11/04*    (2006.01)

(52) U.S. Cl. .................. 52/2.25; 52/2.11; 52/3; 52/4; 160/40; 47/32.1

(58) Field of Classification Search .............. 52/2.11, 52/2.13, 2.17, 2.19, DIG. 14, 3, 4, 5, 2.25, 52/23; 138/98, 93; 92/34, 40, 43, 94; 47/17, 47/32.1; 160/40, 41
See application file for complete search history.

(56) References Cited

U.S. PATENT DOCUMENTS

| | | | | |
|---|---|---|---|---|
| 2,854,014 | A * | 9/1958 | Hasselquist | 52/2.19 |
| 3,125,091 | A * | 3/1964 | Sleeper, Jr. | 126/624 |
| 3,328,926 | A * | 7/1967 | Reinhard | 52/2.17 |
| 3,741,631 | A * | 6/1973 | Laing | 359/228 |
| 3,870,085 | A * | 3/1975 | Schneider | 138/93 |
| 4,027,437 | A | 6/1977 | Monsky et al. | |
| 4,076,872 | A * | 2/1978 | Lewicki et al. | 428/12 |
| 4,163,342 | A * | 8/1979 | Fogg et al. | 47/58.1 R |
| 4,182,307 | A * | 1/1980 | Brindle et al. | 126/625 |
| 4,290,242 | A * | 9/1981 | Gregory, Jr. | 52/2.17 |
| 4,301,626 | A * | 11/1981 | Davis et al. | 52/2.17 |
| 4,352,259 | A * | 10/1982 | Smith et al. | 52/2.17 |
| 4,452,230 | A * | 6/1984 | Nelson | 126/621 |
| 4,672,888 | A * | 6/1987 | Crombie et al. | 454/254 |
| 4,685,253 | A * | 8/1987 | Bitterly | 52/2.11 |
| 4,784,042 | A * | 11/1988 | Paynter | 91/534 |
| 5,429,851 | A * | 7/1995 | Sallee | 428/71 |
| 5,546,707 | A * | 8/1996 | Caruso | 52/2.13 |
| 5,555,678 | A * | 9/1996 | Schoo | 52/2.13 |
| 5,937,732 | A * | 8/1999 | Homann | 92/43 |
| 6,000,170 | A | 12/1999 | Davis | |
| 6,442,903 | B1 | 9/2002 | Hebert | |
| 6,463,699 | B1 * | 10/2002 | Bailey et al. | 52/2.11 |
| 6,547,189 | B1 * | 4/2003 | Raboin et al. | 244/158.3 |
| 6,606,826 | B2 * | 8/2003 | Nagle | 52/2.18 |
| 7,086,322 | B2 * | 8/2006 | Schulz | 92/42 |

(Continued)

*Primary Examiner*—Robert J Canfield
*Assistant Examiner*—Matthew J Gitlin

(57) ABSTRACT

Modular inflatable cover for buildings, comprising separate coaxial conduits (30) secured together by tensionable link (50) and fluid-connected by coaxial inflatable tube (24). Tube (24) securely embraces sliders (32) that in turn closely but freely embrace conduits (30). Sliders (32) are urged by springs (34) to keep tube (24) taught. Elastic cinctures (26) on tube (24) and springs (34) tensionably cooperate against inflation means to provide reliable control of openings between adjacent modules in an assembly. Conduits (30) are securely torqued to ground anchors (40) by coupling (42). End covers (44) and sliders (32) are provided to compensate for and facilitate length shrinkage of tube (24), upon inflation. The present invention provides a variable cover with integral support that is uniquely capable of exploiting canyons and other ground depressions for an unprecedented scale of environment control. Applications include greenhouses, shutters, insulation and shelters.

8 Claims, 11 Drawing Sheets

U.S. PATENT DOCUMENTS

| | | | |
|---|---|---|---|
| 7,434,357 B2* | 10/2008 | Morris | 52/2.22 |
| 2002/0023390 A1* | 2/2002 | Nagle | 52/2.18 |
| 2002/0157322 A1* | 10/2002 | Pedretti | 52/2.13 |
| 2003/0101660 A1* | 6/2003 | Brereton | 52/2.11 |
| 2005/0284031 A1* | 12/2005 | Chen | 52/2.11 |
| 2006/0243337 A1* | 11/2006 | Manners | 138/98 |
| 2006/0260209 A1* | 11/2006 | Pedretti | 52/2.11 |
| 2007/0271854 A1* | 11/2007 | Wiegand et al. | 52/2.11 |

* cited by examiner

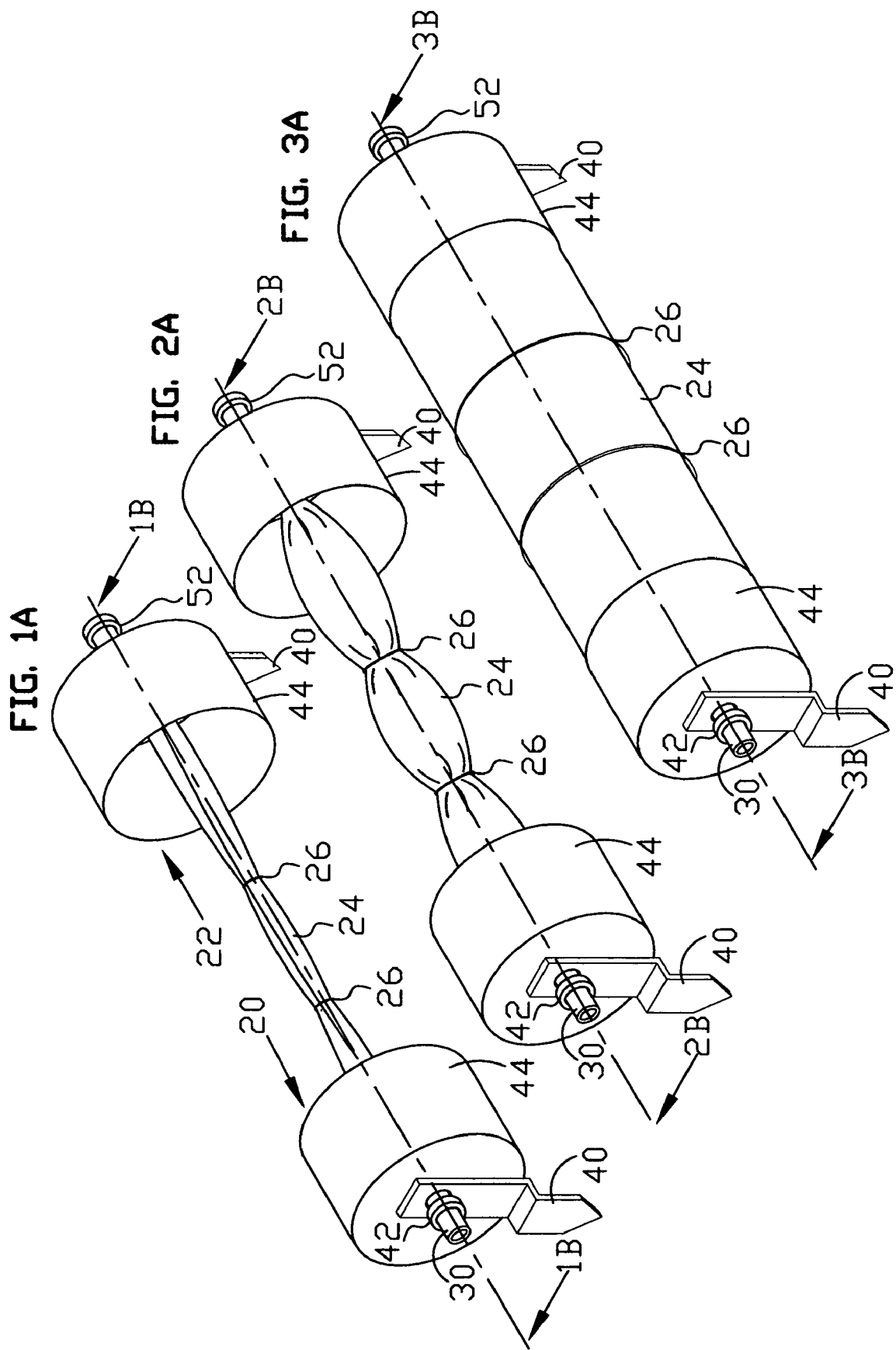

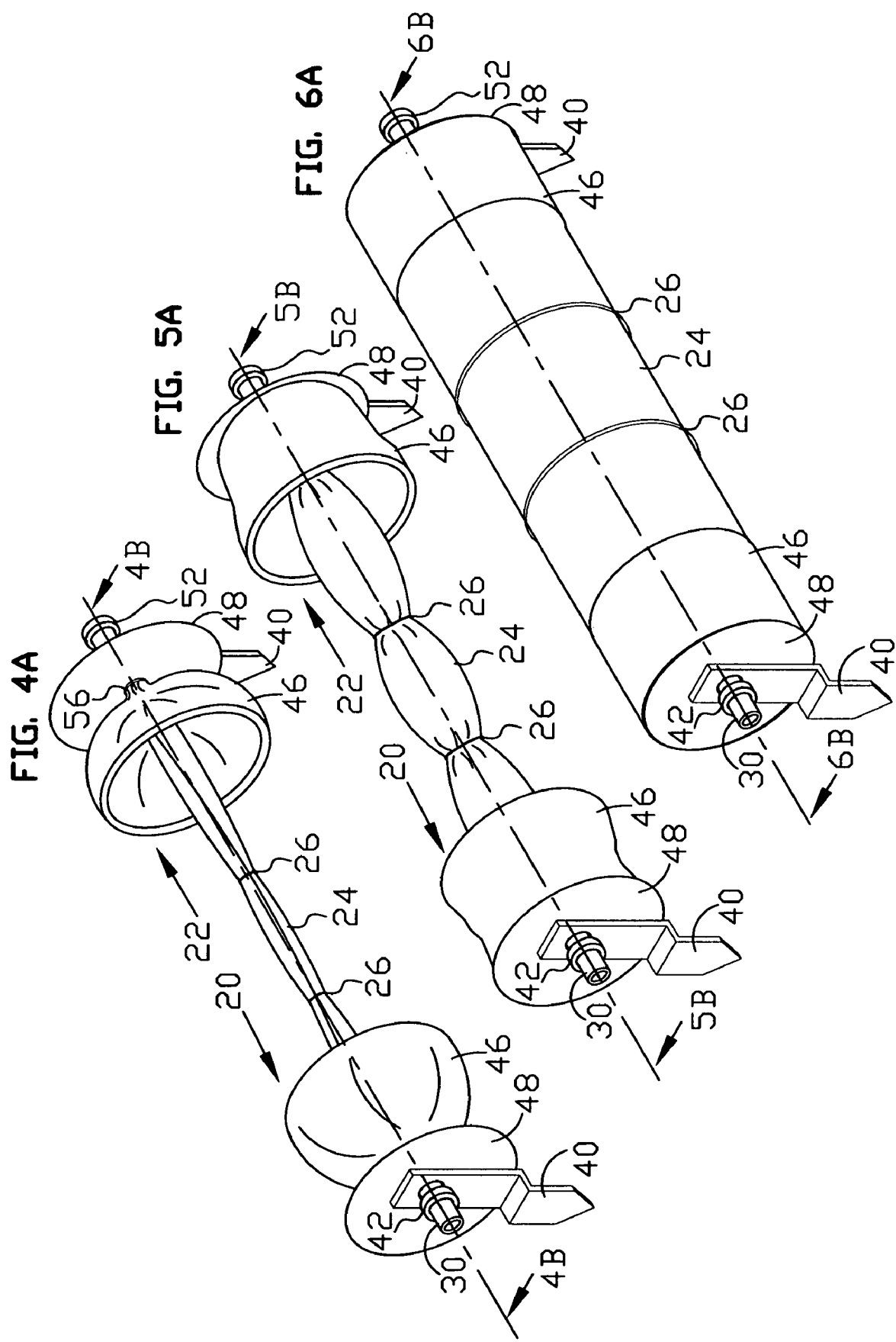

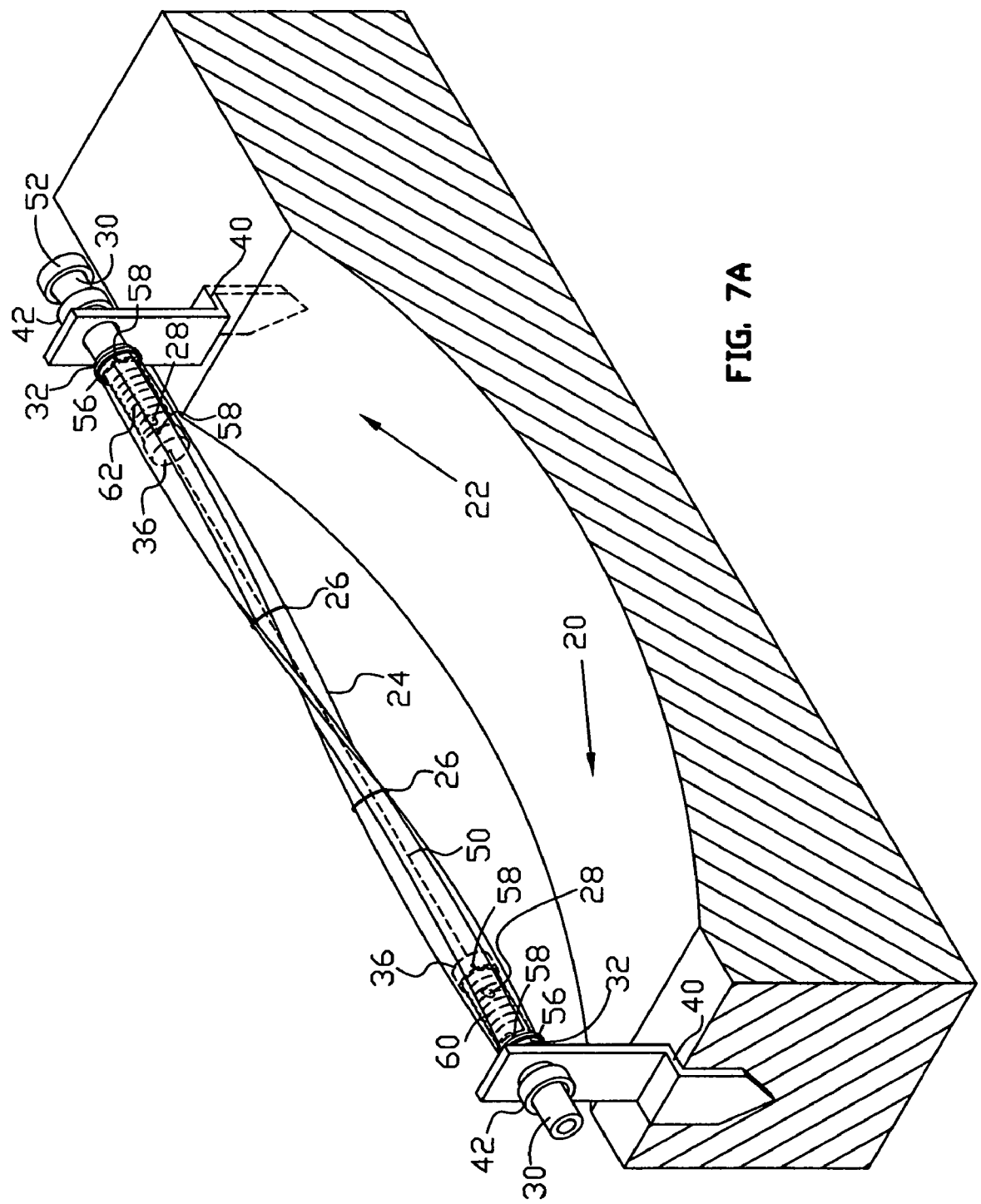

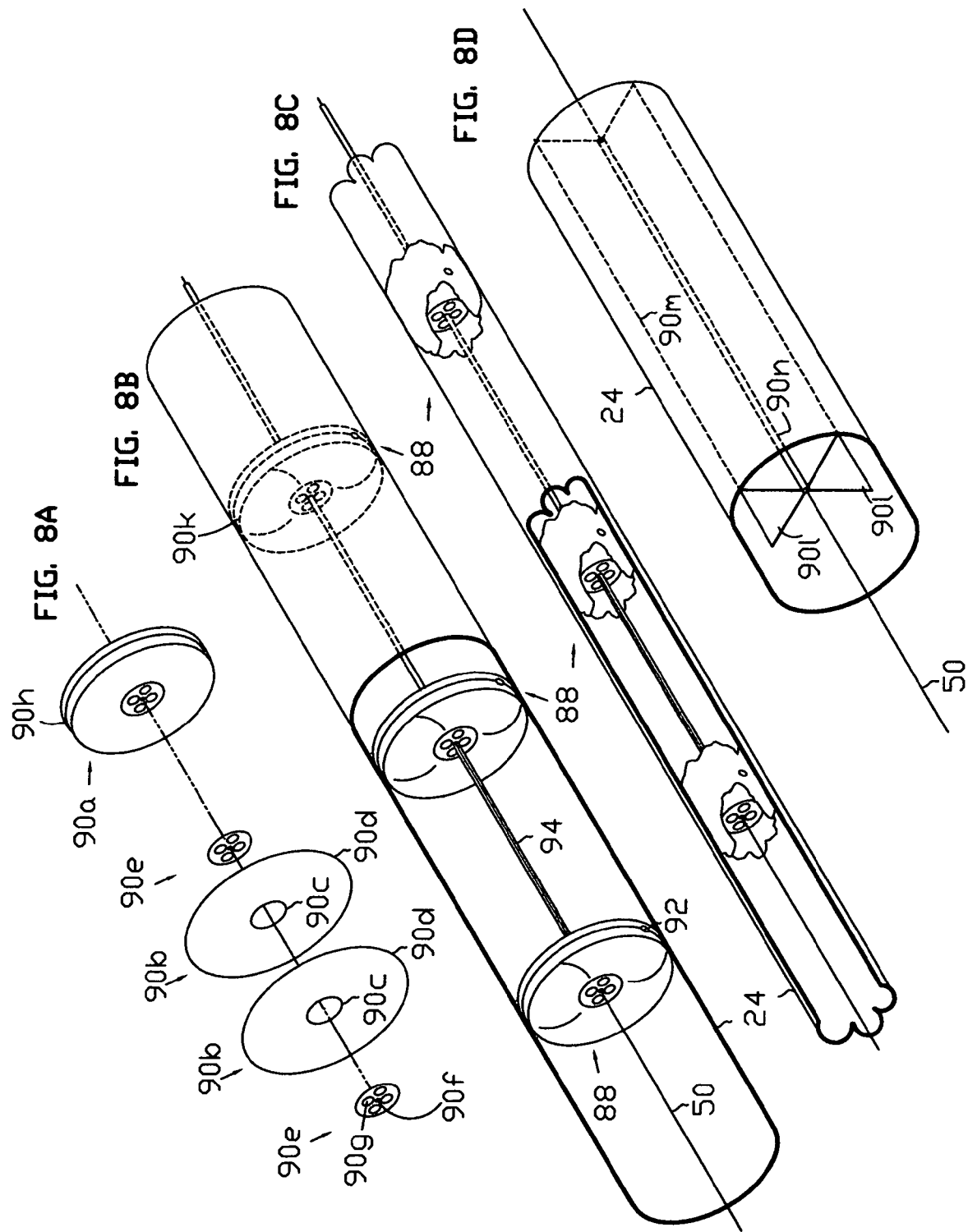

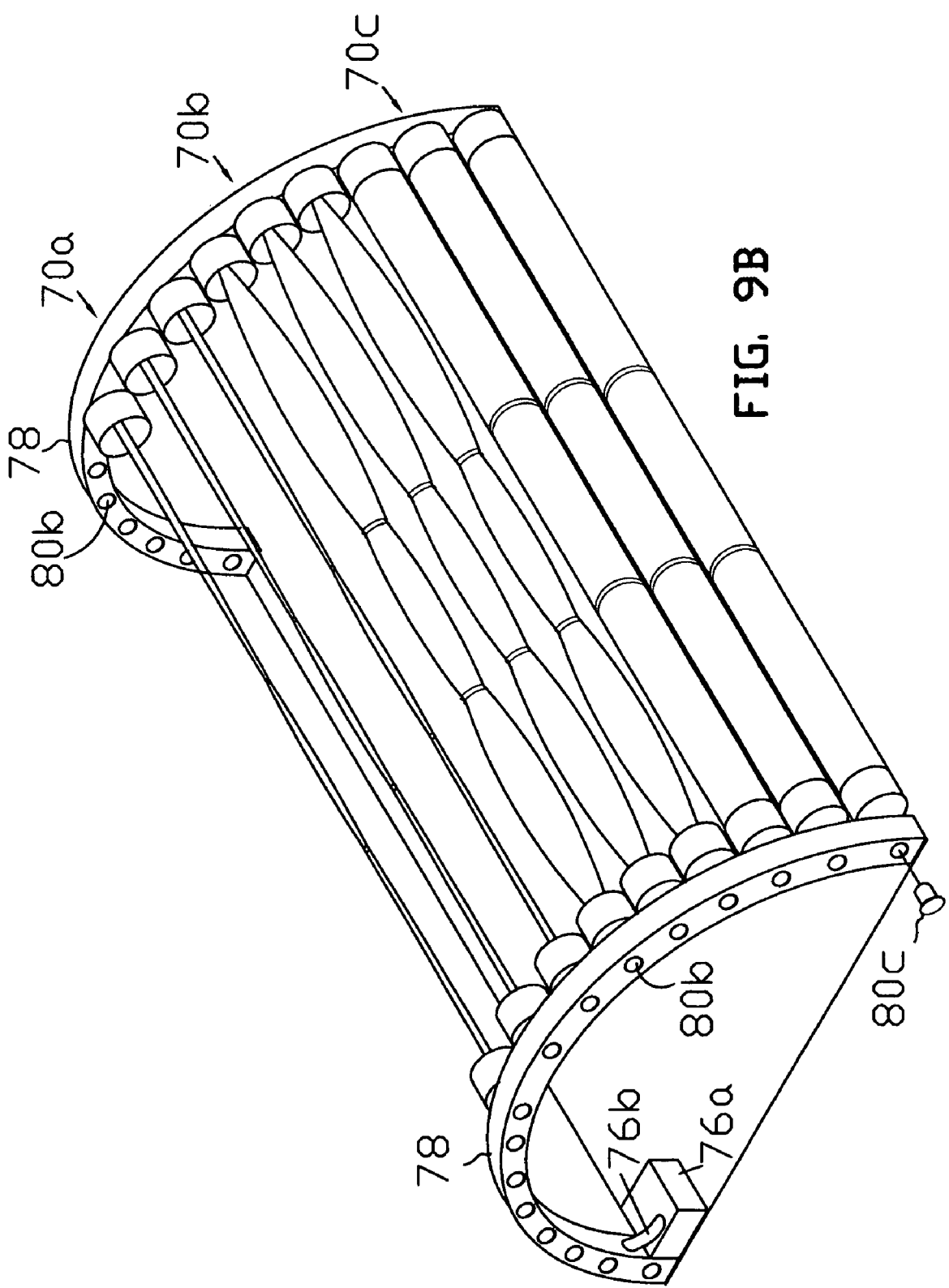

TENSIONED INFLATABLE COVER MODULE

BACKGROUND OF THE INVENTION

1. Field of the Invention

The Tensioned Inflatable Cover Module relates to inflatable buildings and in particular to systems for regulating the flow of fluids and radiation into enclosed spaces as provided, for example, in greenhouses and shelters.

2. Description of the Prior Art

Inflatable buildings have been used extensively in the greenhouse and leisure industries where the relatively low weight, cost and ease of installation are major advantages over more rigid structures built of glass or composite materials. The purpose of these installations has been primarily the provision of more or less controlled environments for plant growth or human activities; an increasingly popular benefit of these microclimate zones has been public enjoyment as provided in garden centers, botanical gardens and sports complexes. With the unabating current deforestation worldwide and the consequent environment degradation, these oasis of life may become increasingly important and perhaps even essential to our continued survival on this Earth. Looking ahead, the initial establishment of human settlements on distant planets, currently focused on Mars, is likely to be dependent on the provision of pockets of controlled environment within the inhospitable alien atmospheres. Among inflatable buildings, greenhouses offer great challenges in design because of the need, on one hand, to allow radiation into the enclosed space for plant growth, and on the other hand also regulate temperature within the often tight limits that are compatible with the biology of the plants being grown.

Current greenhouse designs suffer from limitations in scale or expanse of coverage attributable mostly to the need for a construction frame to support the transparent cover and means for ventilation in the form of motorized fans and shutters. Another limitation to the scale of environment control is the economics that dictate heating the minimum volume of air necessary for plant growth. The small air volumes enclosed by current greenhouses provide little buffering against variations in external climatic factors such as radiation, temperature, wind and precipitation. This low buffering necessitates frequent cycling of climate control means to either remove excess heat by ventilation or to add heat by usually burning fossil fuels. To improve heating efficiency, insulation is usually provided in the form of an inflated air gap between either separate cover sheets or within discreet tubes disposed adjacent to one another to provide a modular, more or less air-tight cover. The double cover, wherein two layers of very large sheets are draped over the outside of the greenhouse frame, has been the main construction method. The apparatus is laborious to assemble and necessitates additional equipment for ventilation in the form of motorized fans and shutters. There has been a steady effort to improve inflatable greenhouses by providing an inflatable cover with variable openings between tubular modules as shown in U.S. Pat. No. 3,328,926 to Reinhard (1967), U.S. Pat. No. 4,027,437 to Monsky et al (1977). Attention to the practical application of this concept has been extended to inflatable insulation covers inside greenhouses as shown in U.S. Pat. No. 4,301,626 to Davis et al (1981), U.S. Pat. No. 4,290,242 to Gregory (1981), U.S. Pat. No. 6,000,170 to Davis (1999), U.S. Pat. No. 6,442,903 B1 to Hebert (2002). All the aforesaid designs are limited to small scale, mostly indoor applications mainly because of their dependency on a supporting frame and the lack of rugged integral means for module support. These designs also lack dependable means of maintaining openings between the tubes in windy outdoors conditions mostly because they utilize gravity-dependent mechanisms of tube deflation. Deflation of the tube per se does not automatically provide consistent gaps between modules because the tubes tend to flatten, sag and flap in the wind. The embodiment in U.S. Pat. No. 4,027,437 to Monsky et al (1977) achieves tube deflation by powered suction of air from the inflatable tube via ducting additional to that providing inflation air; whereas this dual plumbing system can inflate and deflate the device, consistent ventilation gaps between tubes are restricted to the side walls where spatially-offset tube assemblies part upon deflation. In fact, when the contiguous, oval tube arrangement disclosed in the aforesaid patent is deflated, a flattened ribbon-like curtain is created on the roof of the building mostly because the spacing between inflated tubes, center to center, is less than the tube maximum diameter, causing the flattened tubes to remain contiguous, if not overlapped. U.S. Pat. No. 3,328,926 to Reinhard (1967) does not disclose any reliable or consistent method of achieving ventilation gaps between inflatable tubes, upon deflation.

Therefore, it is an object and advantage of the Tensioned Inflatable Cover Module to provide a novel cover module suitable for outdoor use, fitted with integral support and dependable means of achieving ventilation gaps between adjacent modules. It is an object and advantage of the Tensioned Inflatable Cover Module to provide novel frame-less means of covering enclosed areas for environment control. It is also an object and advantage of the Tensioned Inflatable Cover Module to enable provision of enclosed spaces of unprecedented volume to afford improved buffering capacity against changes in external environmental factors. It is yet another object and advantage of this invention to exploit natural features such as canyons, craters, valleys, coulees, water bodies or man-made depressions to dispense of the need for construction frames. It is a further object and advantage of this invention to provide a novel variable cover that can also be used on framed building structures. Other objects and advantages of my invention will become apparent from the detailed description that follows and upon reference to the drawings.

SUMMARY OF THE INVENTION

The Tensioned Inflatable Cover Module is an inflatable apparatus or assembly thereof designed to provide reliable control of the flow of fluids and radiation between an enclosed space and its surroundings. Essentially the invention comprises an inflatable tube mounted on end supports that can move along end fluid conduits, the conduits being fluidly-connected to the tube. One conduit is open for transit of inflation fluid in and out of the inflatable tube and another conduit is closed to retain fluid within the apparatus. End covers and the tube's movable supports are provided to compensate for and facilitate shrinkage of the length of the inflatable tube, which occurs upon inflation. Steady tension is maintained on the inflatable tube by the squeezing action of peripheral elastic cinctures and the tugging of springs on the tube's end supports, from a minimum deflated bundle outer diameter to a substantially larger inflated outer diameter. A structural, tensionable member secures the conduits together. Conduits are in turn adjustably secured either to building frames or to peg-like anchors, which may be driven into the ground or fastened to building frames, posts and the like. The desired size of gaps between adjacent modules of an assembly can be set at installation on site and can be controlled in operation by varying the extent of tube inflation. Control of the size of the gaps in turn affords control of the flow of fluids and radiation between the enclosed space and its surroundings. The Tensioned Inflatable Cover Module is particularly suited for novel inflatable building structures that can span natural and man-made depressions, e.g. canyons, craters, valleys, coulees, embankments and the like, to provide unprecedented scale of ground and space coverage. Other uses include insulation, shutters, shelters, and cover for greenhouse frames.

BRIEF DESCRIPTION OF THE DRAWINGS

In drawings which illustrate embodiments of the invention,
FIG. 1A shows a deflated module fitted with end covers, in isometric view
FIG. 2A shows a partially-inflated module fitted with end covers, in isometric view
FIG. 3A shows a fully-inflated module fitted with end covers, in isometric view
FIG. 4A shows a deflated module fitted with bellows, in isometric view
FIG. 5A shows a partially-inflated module fitted with bellows, in isometric view
FIG. 6A shows a fully-inflated module fitted with bellows, in isometric view
FIG. 7A is an isometric view showing a module fitted with torsional deployment means for the inflatable tube, installed over a valley section,
FIG. 8A is an exploded view showing construction of the tube support ring,
FIG. 8B shows support rings inside an inflated inflatable tube, in isometric view
FIG. 8C shows support rings in a deflated inflatable tube, in isometric view
FIG. 8D shows radial reinforcing sheet system inside an expanded inflatable tube,
FIG. 9B is a partial view showing a plurality of modules installed as a cover on arched square tubing frames to form a greenhouse or shelter.

Figure 1B:
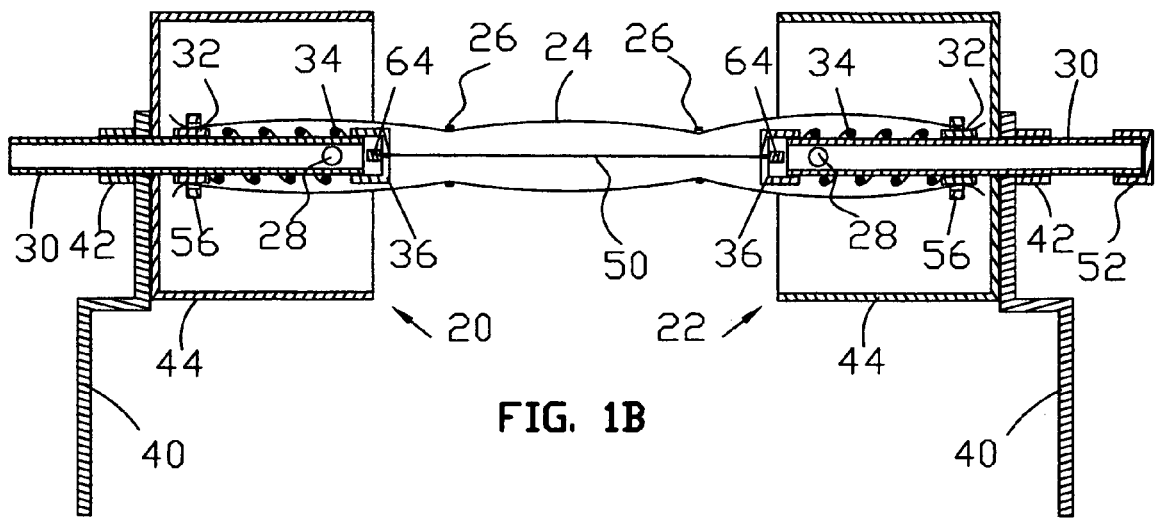
FIG. 1B is a sectional view of the module shown in FIG. 1A along line 1B-1B.
Figure 2B:
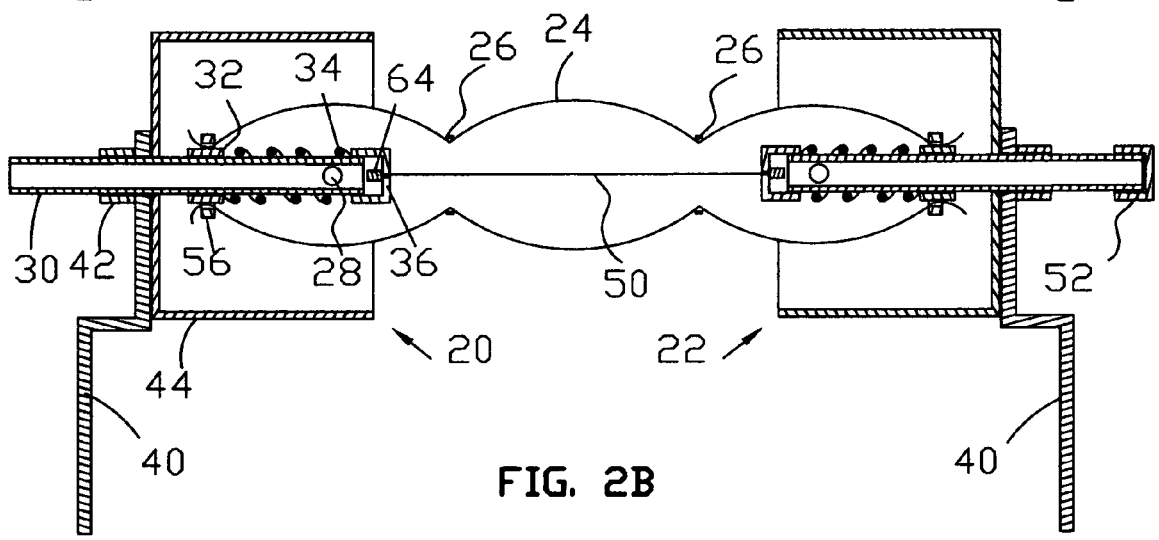
FIG. 2B is a sectional view of the module shown in FIG. 2A along line 2B-2B.

REFERENCE NUMERALS IN DRAWINGS 20 open end
22 closed end
24 inflatable tube
26 elastic cincture
28 fluid transit hole
30 conduit
32 slider
34 compression spring
36 block
38 extension spring
40 anchor
42 tension coupling
44 end cover
46 bellows
48 end plate
50 ends link
52 plug
56 clamp
58 spring hole
60 dextrarotary spring
62 levorotary spring
64 link retainer
68 bellows fluid hole
70a group of modules in deflated state
70b group of modules in partial inflation state
70c group of modules in full inflation state
72a upright channel
72b horizontal channel
72c channel cover
74 end frame assembly
76a inflation means
76b fluid duct
78 arched end frame
80a conduit aperture
80b conduit access hole
80c access hole plug
82 main duct
84 secondary duct
86 enclosed valley
88 support ring
90a inflatable bag
90b ring walls
90c ring wall aperture
90d ring wall edge
90e ring fastener
90f carriage hole
90g fluid passage
90h edge weld
90k ring to tube weld
90l radial reinforcing sheet
90m sheet to tube weld
90n central tubing
90p chordate sheet
92 deflation hole
94 spacer sheath

DESCRIPTION OF THE PREFERRED EMBODIMENTS

Scope and Materials

The present invention relates to buildings and more particularly to a novel, modular inflatable building particularly adapted for use as a greenhouse, shelter and the like. Materials suitable for constructing the Tensioned Inflatable Cover Module are well known to those skilled in the art. Essentially one needs fasteners, inflatable tubes, cables or ropes, springs, bars, sheets and tubing. Inflatable covers for greenhouses are usually made out of polymers e.g. clear polyethylene. However, where light is not required other flexible material, e.g.

fabric, opaque polymers, may be used to construct the inflatable tubes. Other components of this module can be made out of sheets, tubing and bars of metal, polymer or composite, which may be cut to size, shaped, drilled, threaded, glued, or welded for fastening. Current plumbing supplies or like products can also be used. The choice of materials is only limited by the intended use and engineering considerations and would be obvious to those skilled in the art. The preferred embodiments of the Tensioned Inflatable Cover Module will now be discussed starting with the embodiment fitted with end covers, followed by the embodiment fitted with bellows, followed by the embodiments fitted with torsional deployment and reinforcements of the inflatable member. A brief discussion of alternative embodiments of the present invention will close the description. Hereafter the Tensioned Inflatable Cover Module will alternatively be referred to simply as the module.

Module Fitted with End Covers—FIG. 1A-3A, 1B-3B

Reference will now be made to the isometric view of the Tensioned Inflatable Cover Module depicted in FIG. 1A and related details of construction illustrated in the sectional view of FIG. 1B. The Tensioned Inflatable Cover Module comprises at least an open end 20, open to the surrounding fluid environment and a closed end 22, closed to the surrounding fluid environment, connected to each other by an inflatable tube 24 which may be fitted with peripheral elastic cinctures 26. The open end 20 and the closed end 22 comprise a conduit 30 fluid-connected to the inflatable tube 24 via at least one fluid transit hole 28. The conduit 30 at the closed end 22 is closed by means of a plug 52. The inflatable tube 24 is securely attached onto a slider 32 by means of a clamp 56, the slider 32 closely but freely embracing the conduit 30 on which it may rotate and translate. An elastic device, e.g. a compression spring 34 confined to the conduit 30 by a block 36, is secured to and acted upon by rotational and translational movements of the slider 32 along the conduit 30. Spring 34 is confined to the conduit 30 by the block 36 and may also be fastened at its ends to the slider 32 and to the block 36 by welding or bonding. The conduit 30 may be threaded and adjustably secured either to a building framing member, not shown, or to an end anchor 40 by means of a tension coupling 42. An end cover 44, integral with the end anchor 40 or fastened to it, may be provided to more or less embrace the inflatable tube 24. The conduits 30 at the module's ends may be secured to each other by a tensionable ends link 50, secured onto the block 36 by means of a link retainer 64. Tension of the ends link 50 may be adjusted via torquing of the tension coupling 42 onto a threaded conduit 30 and bearing against the face of the end anchor 40 or any suitable framing member, not shown, used as support for the conduits 30.

Module Fitted With Bellows—FIG. 4A-6A, 4B-6B

Reference will now be made to the isometric view of the Tensioned Inflatable Cover Module depicted in FIG. 4A and related details of construction illustrated in the sectional view of FIG. 4B. The module fitted with bellows comprises at least the open end 20, open to the surrounding fluid environment and the closed end 22, closed to the surrounding fluid environment, connected to each other by the inflatable tube 24 which may be fitted with peripheral elastic cinctures 26. The open end 20 and the closed end 22 comprise the conduit 30 fluid-connected to the inflatable tube 24 via at least one fluid transit hole 28. The conduit 30 at the closed end 22 is closed by means of the plug 52. The inflatable tube 24 is securely attached onto the slider 32 by means of the clamp 56. The inflatable tube 24 is extended past the slider 32 and secured to the conduit 30 to provide an inflatable bellows 46, which more or less embraces the inflatable tube 24; the bellows 46 is buttressed by a steady end plate 48, integral with the end anchor 40 or fastened to it. The portion of the conduit enclosed by the bellows 46 is provided with a bellows fluid hole 68 fluidly-connecting the bellows 46 to the lumen of the conduit 30. The slider 32 closely but freely embraces the conduit 30 on which it may rotate and translate. An elastic device, e.g. an extension spring 38, confined to the conduit 30 by the block 36, is secured to and acted upon by rotational and translational movements of the slider 32 along the conduit 30. Spring 38 is confined to the conduit 30 by the block 36 and may also be permanently fastened at one end to the slider 32 and to the conduit 30 at the other end, by welding, bonding or by securing its end hooks into a spring hole 58.

The conduits 30 may be secured to each other by a tensionable ends link 50, secured onto the block 36 by means of the link retainer 64. Tension of the ends link 50 may be adjusted via torquing of the tension coupling 42 onto a threaded conduit 30 and bearing against the face of the anchor 40 or any suitable framing member, not shown, used as support.

Figure 7B:
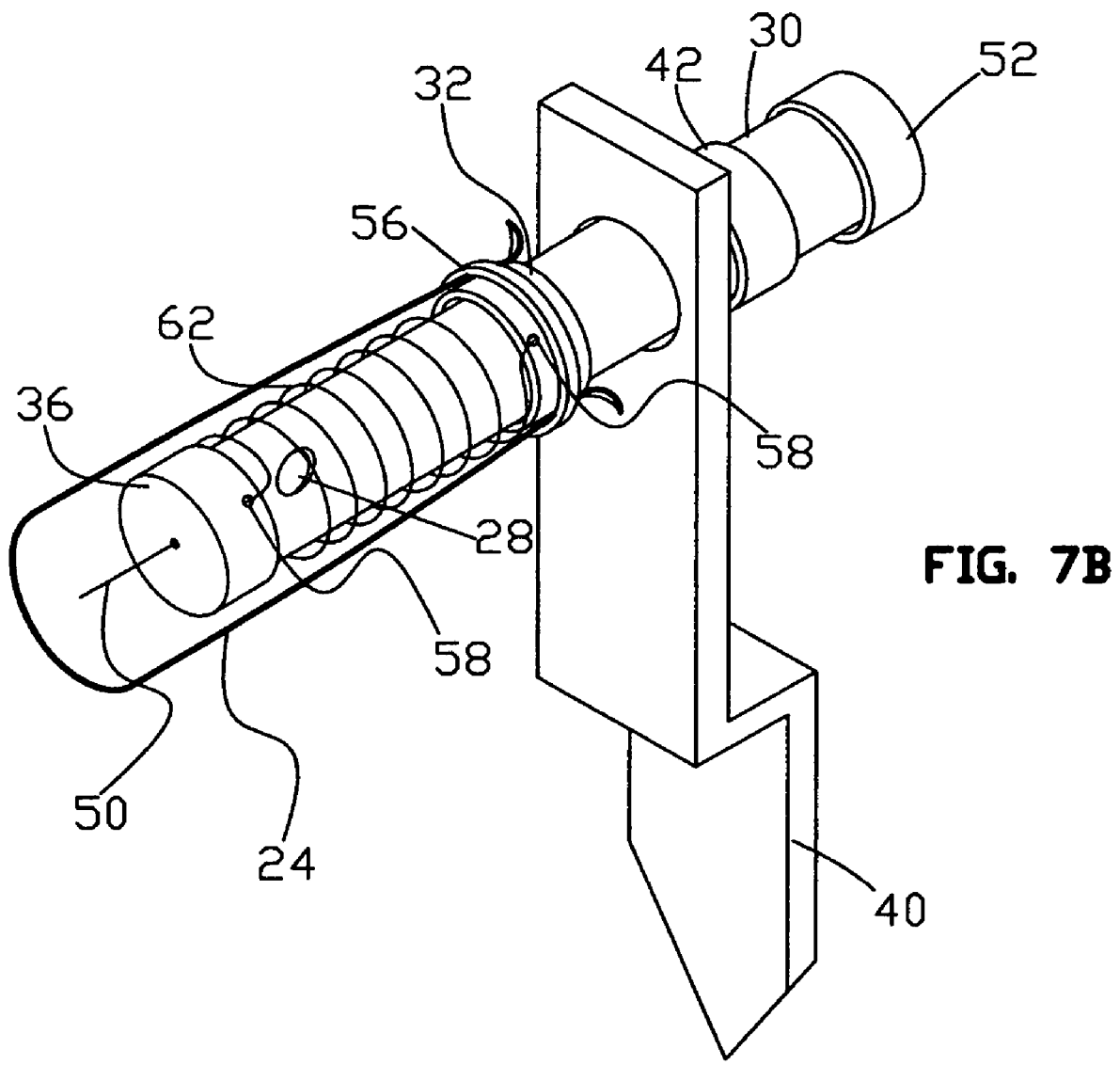
FIG. 7B is an enlarged view of the closed end of the module shown in FIG. 7A with the inflatable tube sectioned to show internal details of construction.

Module Fitted with Torsional Deployment of the Inflatable Tube—FIG. 7A, 7B

FIG. 7A illustrates that embodiment of the Tensioned Inflatable Cover Module making use of helical folding of the inflatable tube 24, by spring-assisted torsion, to strengthen the tube 24 and assist with its deflation. Helical folding of the inflatable tube 24 can assist with its deflation and impart to it increased strength in the same manner that twisted threads give a rope its strength. The module of this embodiment comprises at least the open end 20, open to the surrounding fluid environment and the closed end 22, closed to the surrounding fluid environment, connected to each other by the inflatable tube 24 which may be fitted with peripheral elastic cinctures 26. The open end 20 and the closed end 22 each comprise the conduit 30 fluid-connected to the inflatable tube 24 via at least one fluid transit hole 28. The conduit 30 at the closed end 22 is closed by means of the plug 52. Details of the aforesaid construction are illustrated in the enlarged view of the closed end 22, shown in FIG. 7B. The inflatable tube 24 is securely attached onto the slider 32 by means of the clamp 56, the slider 32 closely but freely embracing the conduit 30 on which it may rotate and translate. Counter-rotating elastic devices, e.g. rotating or wound to the right as in a dextrarotary spring 60 and to the left as in a levorotary spring 62, are secured to and acted upon by rotational and translational movements of the slider 32 along the conduit 30. Springs 60, 62 are confined to the conduit 30 by the block 36 and are also fastened at one end to the slider 32 and to the block 36 at the other end, by welding, bonding or by securing their end hooks into the spring hole 58. To install the tube 24 of this embodiment the inflatable tube 24 is first secured on the slider 32 by clamp 56 at the closed end 22. One or more helical twists are then imparted to the inflatable tube 24 before fastening onto the slider 32 at the open end 20, via clamp 56, to give the twisted conformation depicted in FIG. 7A. The conduit 30 may be threaded and adjustably secured either to a building framing member, not shown, or to the anchor 40 by means of the tension coupling 42. The conduits 30 at the module's ends may be secured to each other by the tensionable ends link 50, secured onto the block 36 as previously described. Tension of the ends link 50 may be adjusted via torquing of the tension coupling 42 onto the threaded conduit 30 and bearing against the face of the end anchor 40 or any suitable framing member, not shown, used as support.

Embodiments providing reinforcement of the inflatable tube

Figure 8E:
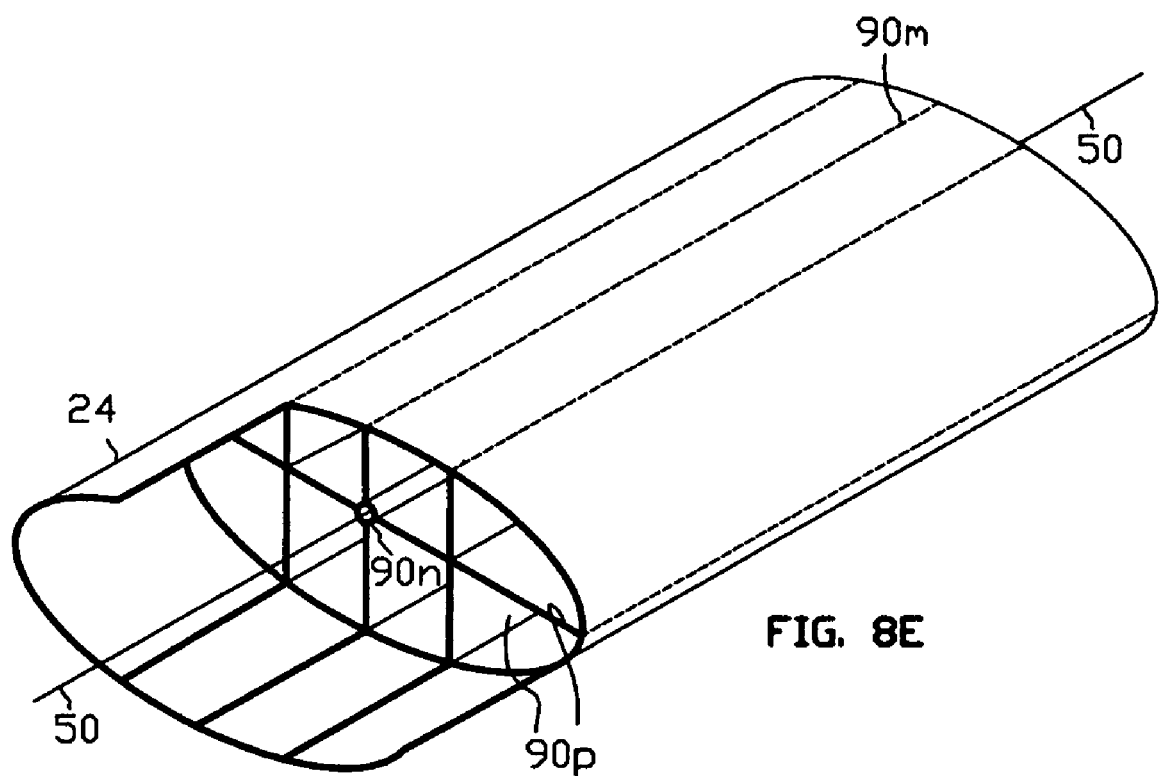
FIG. 8E is a partial sectional view of chordate sheets inside a reinforced inflatable tube.

In addition to the support provided to tube 24 by sliders 32, as previously discussed, structural stability of the module can be increased by internal walling of the inflatable tube 24 and anchorage on the ends link 50. The embodiment making use of a support ring as shown in FIG. 8A-8C will be described first, followed by the embodiment making use of radial reinforcing sheets as depicted in FIG. 8D and lastly by the embodiment making use of chordate sheets as shown in FIG. 8E.

Support Ring for Inflatable Tube—FIG. 8A-8C

FIGS. 8A-8C illustrate construction of the support ring 88, an internal wall that anchors the inflatable tube 24 onto the ends link 50. Where module length or load conditions dictate additional support of the inflatable tube 24 about the ends link 50, a support ring 88, more or less centered on the ends link 50 through a carriage hole 90f, may be provided. The support ring 88 is welded to the inner surface of the inflatable tube 24 by a ring to tube weld 90k, as shown in FIG. 8B. The support ring 88 can be made from any material suitable for the intended application; for a greenhouse application, ring walls 90b made out of clear, flexible polymer sheeting are first welded together along ring wall edges 90d by an edge weld 90h to form a bag, as shown in FIG. 8A. Ring fasteners 90e, their fluid passages 90g aligned, are then welded co-axially to the outer surface of the ring walls 90b, along the line of a ring wall aperture 90c, to form an inflatable bag 90a. The inflatable bag 90a can be inflated with fluid e.g. air, through fluid passages 90g. While inflated, the Bag 90a is then sealed by welding together the opposing ring fasteners 90e, previously welded to the ring walls 90b. The resulting sealed inflated support ring 88 can then be slid onto the ends link 50 through the carriage hole 90f and positioned inside the inflatable tube 24 for the ring to tube weld 90k to be effected, as shown in FIG. 8B. Once welded to the inflatable tube 24, the inflated support ring 88 can be deflated by making a deflation hole 92 through the ring to tube weld 90k. The support ring 88 resulting from the aforesaid description anchors the inflatable tube 24 onto the ends link 50 as shown in FIG. 8B and allows deflation of the inflatable tube 24 to occur as illustrated in FIG. 8C. Location and number of support rings 88 inside the inflatable tube 24 is dictated by the nature and magnitude of anticipated stress loads on tube 24. Location of the support rings 88 inside the inflatable tube 24 may be controlled by means of the length of a spacer sheath 94, the latter preferably made out of a rigid tubular material. The spacer sheaths 94 embraces the ends link 50 and are installed between the support rings 88 to confine them to design locations prior to welding to the inflatable tube 24, as previously described.

Radial Reinforcing Sheets for the Inflatable Tube—FIG. 8D

FIG. 8D shows how one or a plurality of similar size reinforcing sheets 90l can be fastened longitudinally to the inner surface of the tube 24, by sheet to tube welds 90m, approximately along radius lines and to a central tubing 90n that embraces the ends link 50. Reinforcement may be localized or run the length of the tube 24, depending on engineering requirements. Current practice in the manufacture of polymer tubing could easily accommodate modifications for dies to extrude the embodiment described as a walled tube with a small sheath at its center.

Chordate Reinforcing Sheets for the Inflatable Tube—FIG. 8E

FIG. 8E shows how one or a plurality of reinforcing sheets 90p can be fastened longitudinally to the inner surface of the tube 24 and along truncated chord lines, by sheet to tube welds 90m and to a central tubing 90n that embraces the ends link 50. The Sheets 90p have a height substantially smaller that the natural inflated diameter of tube 24, in the vertical axis and a width substantially greater than the natural inflated diameter of tube 24, in the horizontal axis. The Sheets 90p of this embodiment form an internal web that sets a desired inflated distance between opposing surfaces of tube 24, upon inflation. Current practice in the manufacture of polymer tubing could easily accommodate modifications for dies to extrude the embodiment described as an internally-walled tube with a small sheath at its center.

Alternative Embodiments of the Invention

The preferred embodiments of the Tensioned Inflatable Cover Module, as described above, extend to simplified versions, substitutions, omissions or combinations of components so long as the principle of operation is maintained. Some alternative embodiments are discussed below.

The conduit 30 at the closed end 22 of the module could be replaced by a solid body, given that module inflation can proceed from the conduit 30 at the open end 20. A single modified conduit, extending from the open end 20 to the closed end 22, could replace the conduits 30 and the ends link 50 to combine fluid transit and structural link functions. The ends link 50, more or less coaxial in the preferred embodiment of this invention could be supplemented or substituted altogether by a plurality of structural members linking the conduits 30. One or more similar structural members may also be provided external to the inflatable tube 24 and attached either to other suitable supports, not shown, or to the module's anchors 40 or end covers 44 and supporting the inflatable tube 24 by means of suitable fasteners, e.g. brackets, hooks, rings or elastic devices.

In some applications, the module remains useful without the use of elastic cinctures 26, end covers 44, bellows 46, anchors 40 and one spring per module. These applications include installations in which structural support is provided for the conduits 30 by means of existing framing members or other means, e.g. beams or posts. Other pertinent applications include installations using relatively short module length, powered fluid withdrawal from the module and whenever compensation of shrinkage of coverage, upon expansion, is not required. End covers 44 are shown as cylindrical structures in the preferred embodiments but could be made into any shape convenient for the intended building so long as the internal diameter can accommodate the inflatable tube 24. For example, a square outer shape for the cover 44 would provide a better seal between covers 44 on a level installation whereas a trapezoidal outer shape would achieve the same for a curved wall of covers 44 as would be used on an arched conventional greenhouse frame. Interlocking covers 44 is another, among many other forms and methods of construction that could be employed without departing from the spirit of the present invention.

Operation

Overview

Inflation means are well known to those skilled in the art and are usually provided in the form of a motorized fan pumping a fluid, e.g. air, in and out of the inflatable cover. The Tensioned Inflatable Cover Module or a plurality thereof may be expanded from a minimum bundle outer diameter in the deflated state (FIG. 1A, 4A) through a continuum of variable stages of expansion (FIG. 2A, 5A) to the fully-expanded stage shown in FIG. 3A, 6A. In order to provide openings of the desired size between adjacent modules of an assembly, the maximum outer diameter at full expansion may be designed to be substantially larger than the minimum bundle diameter in the deflated state. During the development of this invention I found that expansion of the inflatable tube 24 causes a reduction of its length, the extent of which is a function of the size differential between the tube maximum inflated diameter and the diameter of the tube's end supports, embodied by the sliders 32. In order to compensate for this length shrinkage, the end cover 44 in FIG. 1A and the bellows 46 in FIG. 4A were devised. The operation of the embodiment making use of end covers 44 to compensate for length shrinkage of the inflatable tube 24 will be described first, followed by that making use of the bellows 46 to achieve the same. The operation of the embodiments making use of torsional deployment of the tube 24 and reinforced inflatable members will also be described.

Module Fitted with Covers 44 for Compensation of Shrinkage of the Tube 24

Figure 3B:
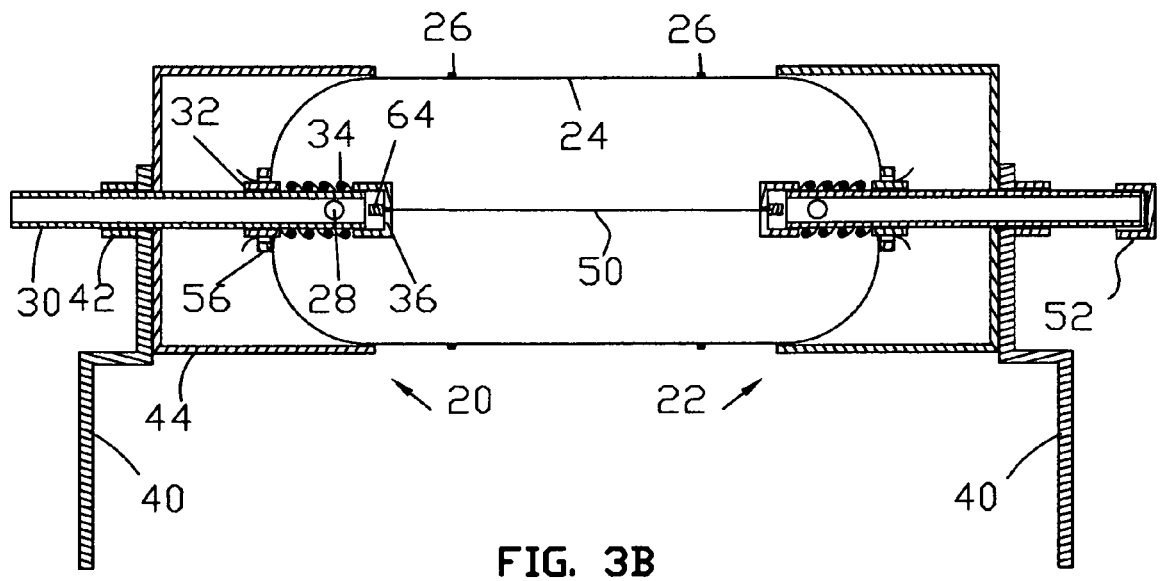
FIG. 3B is a sectional view of the module shown in FIG. 3A along line 3B-3B.

The outward appearance of modules in the sequence of operation of this embodiment is illustrated in FIG. 1A-3A. Related internal details of mechanisms of operation are shown in the cross-sectional views of FIG. 1B-3B. Inflation means are well known to those skilled in the art and are usually provided in the form of a motorized fan pumping a fluid, e.g. air, in and out of the inflatable cover. Starting with the deflated module in FIG. 1A, 1B, expansion of the module or assembly thereof may be achieved by forcing fluids or fluidized substances into the inflatable tube 24 from the open end 20, via the conduit 30 and through at least one fluid transit hole 28 into the inflatable tube 24 and through it to the conduit 30 at the closed end 22. Fluid escape from the module is minimized by way of the conduit plug 52, the close fit between slider 32 and conduit 30 and fastening, via clamp 56, of the inflatable tube 24 onto the slider 32, which it embraces. Increase of fluid pressure inside the inflatable tube 24, relative to the outside, causes the tube 24 to expand against the peripheral restriction of the elastic cinctures 26 and the linear urging restriction of the compression springs 34 on the sliders 32; the resulting constricted conformation is depicted in FIG. 2A, 2B; at this stage the slider 32 has translated along the conduit 30 and towards the fluid transit hole 28 from its original position as shown in FIG. 1B to a new position as shown in FIG. 2B. Further increase of fluid pressure may completely overcome Spring 34 and Cincture 26 restrictions to expand the inflatable tube 24 to its full diameter as shown in FIG. 3A, 3B; at this fully-expanded stage, the slider 32 has translated furthest along the conduit 30 and length shrinkage of the inflatable tube 24 is maximal. The space created by shrinkage of the inflatable tube 24 is covered by the end cover 44 which embraces the fully-expanded tube 24 and thus compensates for the loss of spatial coverage.

The module's outer diameter may be reduced by withdrawing fluids from the inflatable tube 24, the process being assisted by the squeezing action of the elastic cinctures 26 and the linear pulling action of the Springs 34 on the tube 24. Deflation of the module proceeds in a process reverse to that occurring during expansion, going from the fully-expanded stage in FIG. 3A, 3B and through constricted stages in FIG. 2A, 2B and back to the deflated state depicted in FIG. 1A, 1B. Inflation pressure controls the degree of inflation of the module and hence the size of the gaps between adjacent modules in an assembly and between the modules and their surroundings. Size of the openings between adjacent modules and between modules and surroundings determines the extent of fluid and radiation flow between the enclosed space and its surroundings. Thus, control of the inflation pressure of the module can afford control of the enclosed environment.

Module Fitted with Bellows 46 for Compensation of Shrinkage of the Tube 24

Figure 4B:
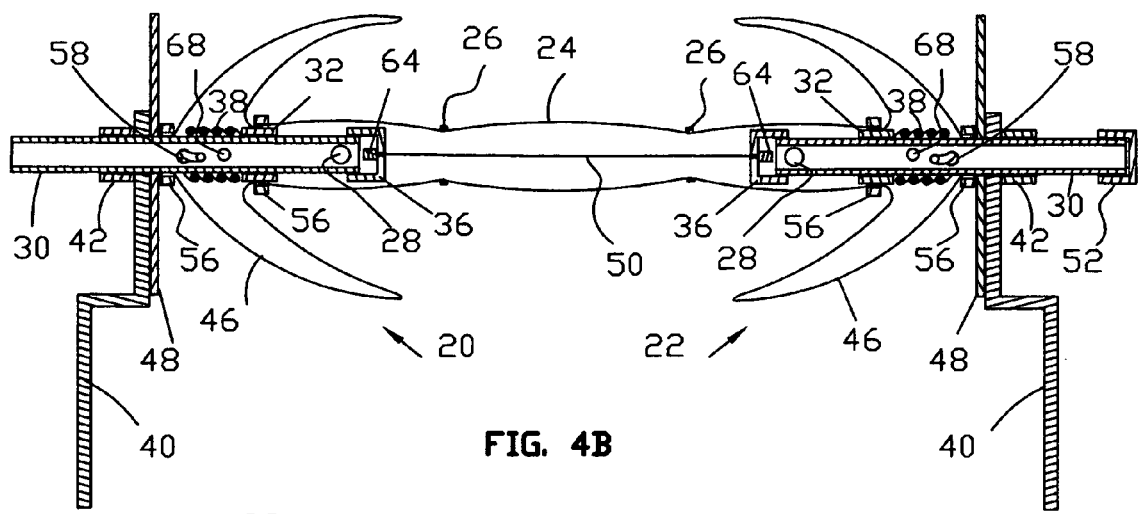
FIG. 4B is a sectional view of the module shown in FIG. 4A along line 4B-4B.
Figure 5B:
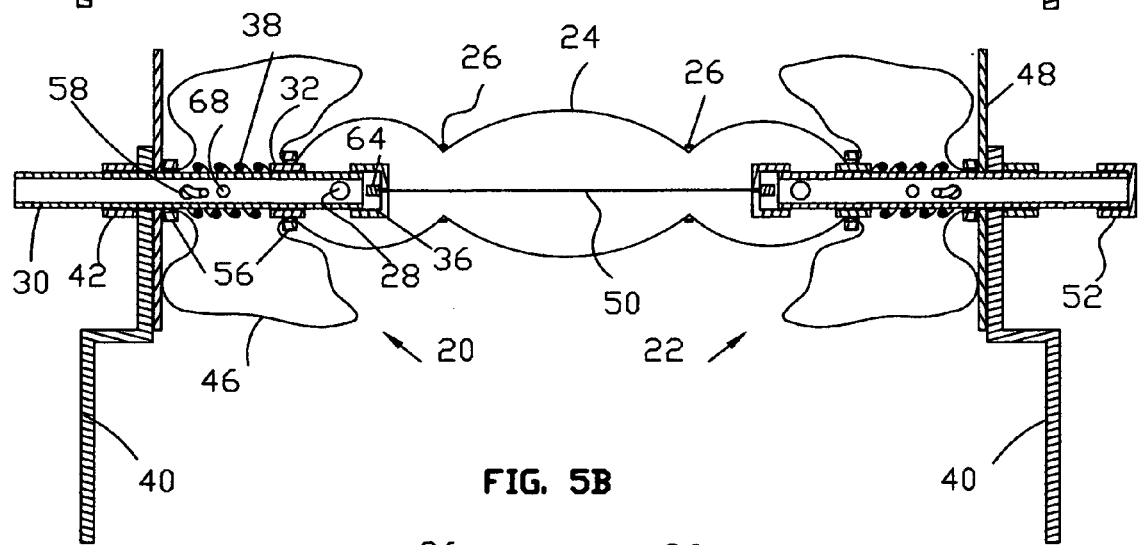
FIG. 5B is a sectional view of the module shown in FIG. 5A along line 5B-5B.
Figure 6B:
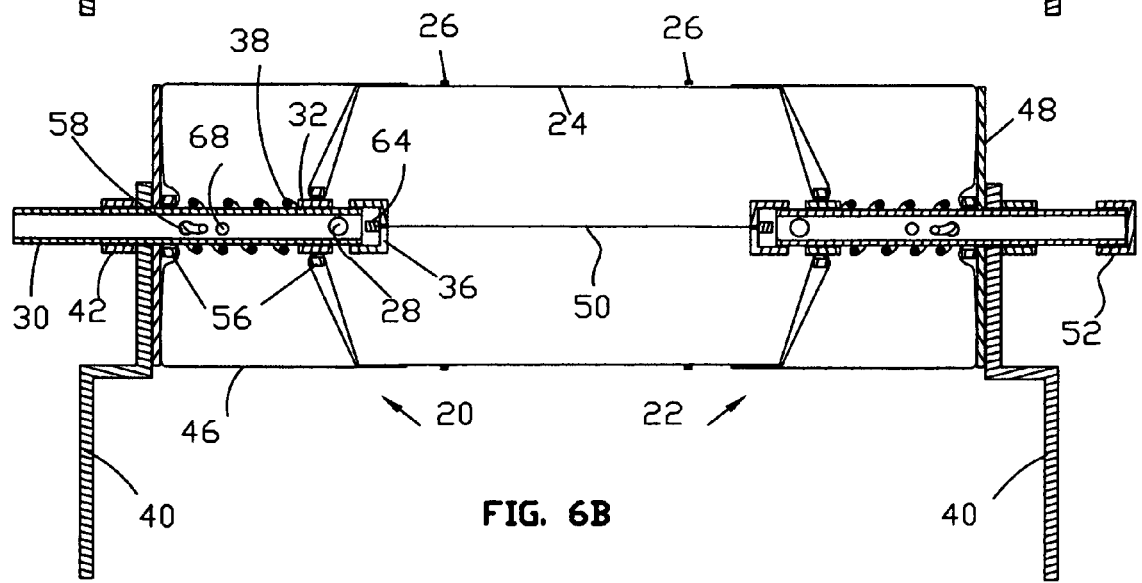
FIG. 6B is a sectional view of the module shown in FIG. 6A along line 6B-6B.

The outward appearance of modules in the sequence of operation of this embodiment is illustrated in FIG. 4A-6A. Related internal details of mechanisms of operation are shown in the cross-sectional views of FIG. 4B-6B. Inflation means are well known to those skilled in the art and are usually provided in the form of a motorized fan pumping a fluid, e.g. air, in and out of the inflatable cover. Starting with the deflated module in FIG. 4A, 4B, expansion of the module or assembly thereof may be achieved by forcing fluids or fluidized substances into the inflatable tube 24 from the open end 20, via the conduit 30 and through at least one bellows fluid hole 68 into the bellows 46 and through at least one fluid transit hole 28 into the inflatable tube 24 and through it to the conduit 30 at the closed end 22. Fluid escape from the module is minimized by the conduit plug 52, the close fit between slider 32 and conduit 30 and fastening, via clamps 56, of the inflatable tube 24 onto the slider 32 and past the slider 32 onto the conduit 30, both of which it embraces. Increase of fluid pressure inside the inflatable tube 24, relative to the outside, causes the tube 24 to expand against the peripheral restriction of the elastic cinctures 26 and the linear urging restriction of the extension springs 38 on the sliders 32; the resulting constricted conformation is depicted in FIG. 5A, 5B; at this stage the slider 32 has translated along the conduit 30 and towards the fluid transit hole 28 from its original position as shown in FIG. 4B to a new position as shown in FIG. 5B. Further increase of fluid pressure inside the tube 24 may completely overcome cincture 26 and spring 38 restrictions to expand the tube 24 and its extension, the bellows 46, to their full diameter as shown in FIG. 6A, 6B. At this fully-expanded stage the slider 32 has translated furthest along the conduit 30 and towards the fluid transit hole 28; length shrinkage of the inflatable tube 24 is maximal. The space created by shrinkage of the length of the tube 24 is covered by the expanded bellows 46 which embraces the fully-expanded tube 24 and thus compensates for the loss of spatial coverage.

The module's outer diameter may be reduced by withdrawing fluids from the inflatable tube 24 and the bellows 46, the process being assisted by the peripheral squeezing action of the elastic cinctures 26 and the linear pulling action of the Springs 38 on the inflatable tube 24. Deflation of the module proceeds in a reverse process, going from the fully-expanded stage in FIG. 6A, 6B and through constricted stages in FIG. 5A, 5B and back to the deflated state in depicted in FIG. 4A, 4B. Inflation pressure controls the degree of inflation of the module and hence the size of the openings between adjacent modules in an assembly and between the modules and their surroundings. Size of the openings between adjacent modules and between modules and their surroundings in turn determines the extent of fluid and radiation flow between the enclosed space and its surroundings. Thus, control of module inflation pressure can afford control of the enclosed environment.

Torsional Deployment of the Inflatable Tube

FIG. 7A illustrates that embodiment of the Tensioned Inflatable Cover Module making use of helical folding of the inflatable tube 24, by spring-assisted torsion, to strengthen the tube 24 and assist with its deflation. Helical folding of the inflatable tube 24 can assist with its deflation and impart to it increased strength in the same manner that twisted threads give a rope its strength. Dextrarotary spring 60, secured at its ends to the slider 32 and to the block 36, is installed at the open end 20 and the levorotary spring 62 is installed similarly at the matched closed end 22, both springs being in a substantially relaxed state. The order of spring installation may be reversed and is given only as a guide. Details of the aforesaid construction are illustrated in the enlarged view of the closed end 22, shown in FIG. 7B. The inflatable tube 24 is first secured on the slider 32 by clamp 56 at the closed end 22. One or more helical twists are then imparted to the inflatable tube 24, anti-clockwise, before fastening onto the slider 32, via clamp 56, at the open end 20 to give the twisted conformation depicted in FIG. 7A. Inflation of the module proceeds as described previously but with the added helical unfolding of the twisted inflatable tube 24 against the torsion resistance of the counter-rotating springs 60, 62. The fully-expanded stage of this alternative embodiment of the module appears similar to the conformations depicted in FIG. 3A, 6A. Deflation to the minimum bundle diameter of the module proceeds in helical folding of the inflatable tube 24 back to the conformation depicted in FIG. 7A, the process being driven by the rotation of the Springs 60, 62 back to their initial, more relaxed state. Torsion of the inflatable tube 24 in the aforesaid manner is designed to assist with deflation of the tube 24, support by wrapping the tube 24 on itself or around the ends link 50, when used, and reduction of the bundle diameter by twisting. As discussed previously, reduction of tube 24 diameter increases the size of the gaps between modules and hence fluid and radiation flow between the space enclosed by the modular cover and its surroundings. Control of gap size thus affords control of the enclosed environment.

Embodiments Providing Reinforcement to the Inflatable Tube

Support ring

FIGS. 8A-8C show one embodiment devised to provide additional support to the inflatable tube 24 of the Tensioned Inflatable Cover Module. Where module length or load conditions dictate increased support, the tube 24 can be anchored on the ends link 50. A support ring 88, more or less centered on the ends link 50 through the carriage hole 90f, may be provided. The support ring 88 is welded to the inner surface of the tube 24 and thus anchors the tube 24 onto the ends link 50 as shown in FIG. 8B and allows deflation of the tube 24 to occur as illustrated in FIG. 8C. Location and number of support rings 88 inside the inflatable tube 24 is dictated by the nature and magnitude of anticipated stress loads on the tube 24. The support rings 88 anchor the inflatable tube 24 on the ends link 50 and thus control swaying, displacement and alignment of modules in a cover assembly, all important considerations particularly for outdoor installations exposed to winds, snow, rain and other meteorological variables. Support of the tube 24 is maximal at full inflation when the transverse radial walls of the support ring 88 are fully extended.

Radial Reinforcing Sheets for the Inflatable Tube

FIG. 8D shows how reinforcing sheets 90*l* are welded longitudinally and radially to the inner surface of the tube 24 to anchor the tube 24 on the ends link 50 via the central tubing 90*n*. The aforesaid reinforcements control swaying, displacement and alignment of modules in a cover assembly. Control of swaying, displacement and alignment of modules ensures stability and reliability of outdoor installations exposed to winds, snow, rain and other meteorological variables. Reinforcement may be localized or run the length of the tube 24, depending on engineering requirements. Support of the tube 24 is maximal at full inflation when the reinforcing sheets 90*l* are fully extended.

Chordate Reinforcing Sheets for the Inflatable Tube

FIG. 8E shows how chordate sheets 90*p* are welded longitudinally to the inner surface of the tube 24 and along truncated chord lines, by sheet to tube welds 90*m* and to a central tubing 90*n* that embraces the ends link 50. The Sheets 90*p* have a height substantially smaller that the natural inflated diameter of tube 24, in the vertical axis and a width substantially greater than the natural inflated diameter of tube 24, in the horizontal axis. The Sheets 90*p* of this embodiment form an internal web that sets a desired inflated distance between opposing surfaces of tube 24, upon inflation. In addition to providing support, control of the distance between opposing surfaces of the inflated tube 24 affords the opportunity to limit the curvature of the inflated tube 24 and extend spatial coverage, as illustrated in FIG. 8E.

Uses

The Tensioned Inflatable Cover Module may be assembled in any desired configuration, e.g. single layer side by side and generally parallel lengthwise, multi-layers at angles to each other, to achieve the desired pattern and extent of coverage; the extent of space and ground coverage is determined by module size, spacing between modules and number of modules assembled.

The Tensioned Inflatable Cover Module or an assembly thereof may be provided with wire, netting, screens or other supports or guides to meet specific installation requirements, e.g. pest control. The following are some of the applications to which the module can be put to use.

Novel Square Frame Greenhouse or Shelter

Figure 9A:
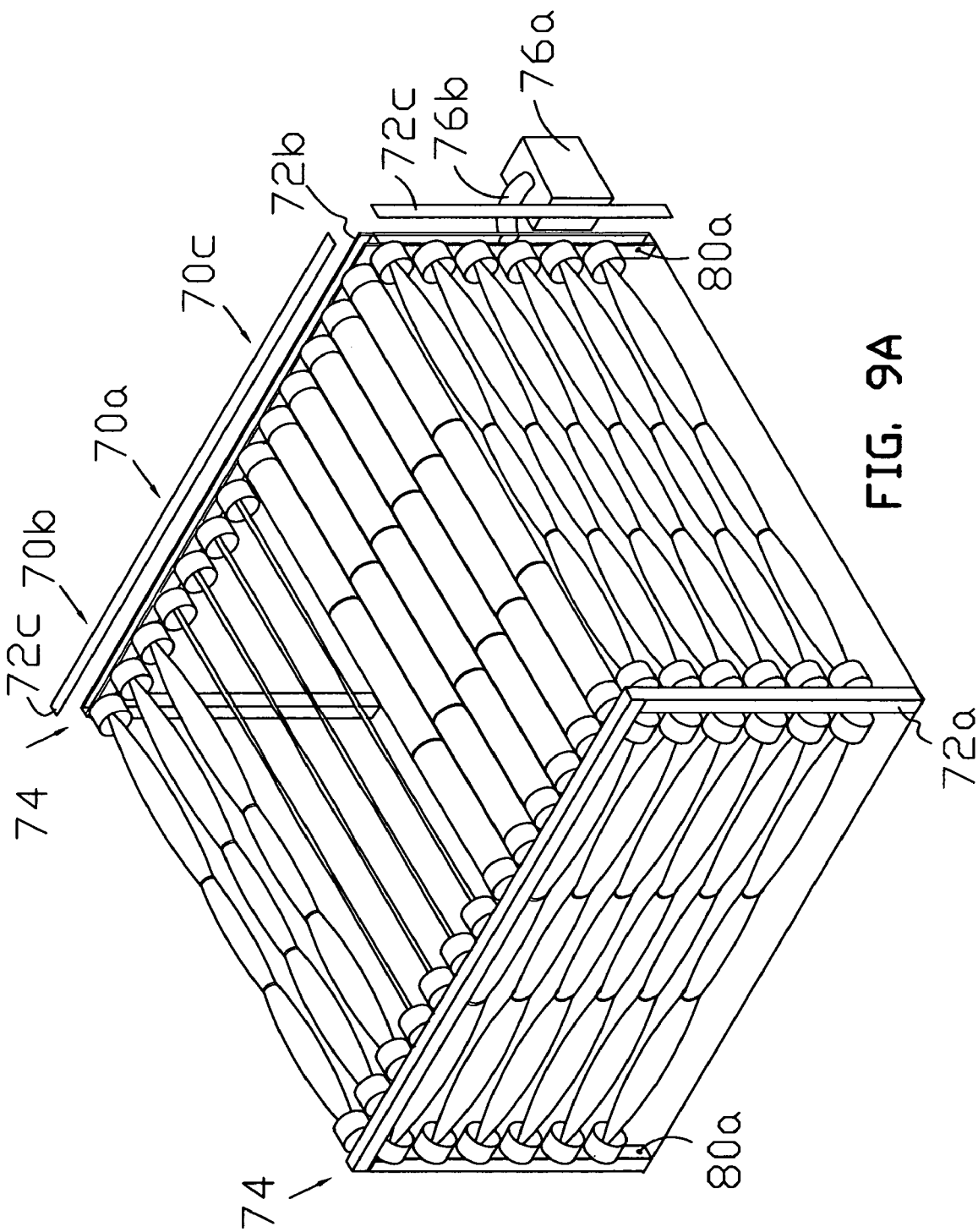
FIG. 9A is a partial view showing a plurality of modules installed as a cover on square channel frames to form a greenhouse or shelter.

An assembly of the Tensioned Inflatable Cover Module can be installed on suitable supports to form a greenhouse, as shown in FIG. 9A. A novel and convenient way of installing the modules on a greenhouse frame makes use of framing members as dual purpose building elements namely for structural support and as fluid transit ducting between modules and inflation means. In FIG. 9A an end frame assembly 74 comprises upright channels 72*a* secured together by a horizontal channel 72*b*. A channel cover 72*c* is provided for fastening over the open channels 72*a*, 72*b* by, for example, screws, bolts, glue or epoxy to provide a substantially sealed fluid conveyance duct between inflation means 76*a* and groups of inflatable modules 70*a*, 70*b*, 70*c* via the fluid duct 76*b*. Modules 70*a*, 70*b*, 70*c*, without anchors 40, are installed onto the frames 74 by inserting their threaded conduits 30 (See FIG. 1A) into aligned conduit apertures 80*a* drilled into the opposing faces of end frame assemblies 74. The conduits 30 are secured on the inside of the Channels 72*a*, 72*b* by torquing the tension coupling 42 onto the conduits 30, against the inner face of the conduit aperture 80*a* as described for the anchors 40 and illustrated in FIG. 1A, 1B.

It will be obvious to those skilled in the art that sealing and backing washers may be provided to better seal the conduit 30 against the inner surface of the framing channels 72*a*, 72*b*. The aforesaid installation results in at least one conduit 30, at the open end 20 of modules 70*a*, 70*b*, 70*c* being in fluid communication with the lumen of one end flame assembly 74. Alternatively, the plug 52 at the closed end 22 of modules 70*a*, 70*b*, 70*c* may be omitted altogether, resulting in conduits 30 at both ends of a module being in fluid communication with the lumens of both frame assemblies 74. It will be obvious to those skilled in the art that the extremities of the Frame Assemblies 74 would have to be sealed to maintain fluid pressure during inflation of the modular cover.

It will also be obvious to those skilled in the art that the Tensioned Inflatable Cover Module may be secured to any suitable support by fastening the anchors 40 thereto by way of, for example, bolts, screws or even more permanently by welding and the like. Anchors 40 may be trimmed, shaped or made to the length appropriate for the installation. It will equally be obvious to those skilled in the art that common plumbing ware and practice may be used to connect the invention modules of groups 70*a*, 70*b*, 70*c* together and to the inflation means 76*a*.

Differential expansion control by means of pre-set known valves may be adopted to provide the desired air flow pattern between the building or greenhouse space and the surrounding atmosphere by keeping a combination of a group of modules in full inflation state 70*c*, a group of modules in deflated state 70*a* or another group of modules in partial inflation state 70*b*. Control of air flow between greenhouse and the surrounding atmosphere by means of the Tensioned Inflatable Cover Module can afford control over the enclosed environment by regulating radiation, temperature and humidity. The Tensioned Inflatable Cover Module can be used as a cover on any suitable building flame.

Novel Arched Frame Greenhouse or Shelter

The Tensioned Inflatable Cover Module, without the anchors 40, can provide useful cover on a building or greenhouse with an arched frame, as illustrated in FIG. 9B. It is known that the arched framing members of such buildings are usually fabricated out of steel tubing, although the choice of material is only limited by the intended use and engineering considerations. conduit access holes 80*b* are drilled through opposing arched end frames 78 and are aligned to receive the module's conduits 30, which may be threaded for fastening. The conduits 30 are then fastened to the inside of the square tubing by torquing the tension coupling 42 onto the conduits 30, against the inside face of the arched frames 78, as previously described for the square frame greenhouse of FIG. 9A. Access for installation is facilitated by the through-hole design of the conduit access holes 80*b* which allows passage of the tension coupling 42 and necessary tooling. It will be obvious to those skilled in the art that sealing and backing washers may be provided to better seal the conduits 30 against the inner surface of the arched frames 78. The aforesaid installation results in at least one conduit 30, at the open end 20 of modules 70*a*, 70*b*, 70*c*, being in fluid communication with the lumen of one of the arched frames 78. Alternatively, the plug 52 at the closed end 22 of modules 70*a*, 70*b*, 70*c* may be omitted altogether, resulting in conduits 30 at both ends being in fluid communication with the lumen of the arched frames 78. It will be obvious to those skilled in the art that the extremities of the frames 78 would have to be sealed to maintain fluid pressure during inflation of the modular cover. For the same reason, the conduit access hole 80*b* is sealed using an access hole plug 80*c*. The foregoing disclose the building Frames 78 as substantially sealed fluid conveyance ducts between inflation means 76*a* and the groups of modules 70*a*, 70*b*, 70*c* via the fluid duct 76*b*. It will also be obvious to those skilled in the art that the Tensioned Inflatable Cover Module may be secured to any suitable support by fastening the anchors 40 thereto by way of, for example, bolts, screws or even more permanently by welding and the like. Anchors 40 (see FIG. 1) may be trimmed, shaped or made to the length appropriate for the installation. It will equally be obvious to those skilled in the art that common plumbing ware and practice may be used to connect the invention modules in groups 70*a*, 70*b*, 70*c* together and to the inflation means 76*a*.

Differential expansion control by means of pre-set known valves may be adopted to provide the desired air flow pattern between the building or greenhouse space and the surrounding atmosphere by keeping a combination of a group of modules in fill inflation state 70*c*, a group of modules in deflated state 70*a* or another group of modules in partial inflation state 70*b*. Control of the flow of air and radiation between greenhouse and the surrounding atmosphere by means of the Tensioned Inflatable Cover Module can afford control over the enclosed environment by regulating radiation, temperature and humidity. The Tensioned Inflatable Cover Module can be used as a cover on any suitable building frame.

Large Scale Environment Control Through Exploitation of Topography

Figure 10:
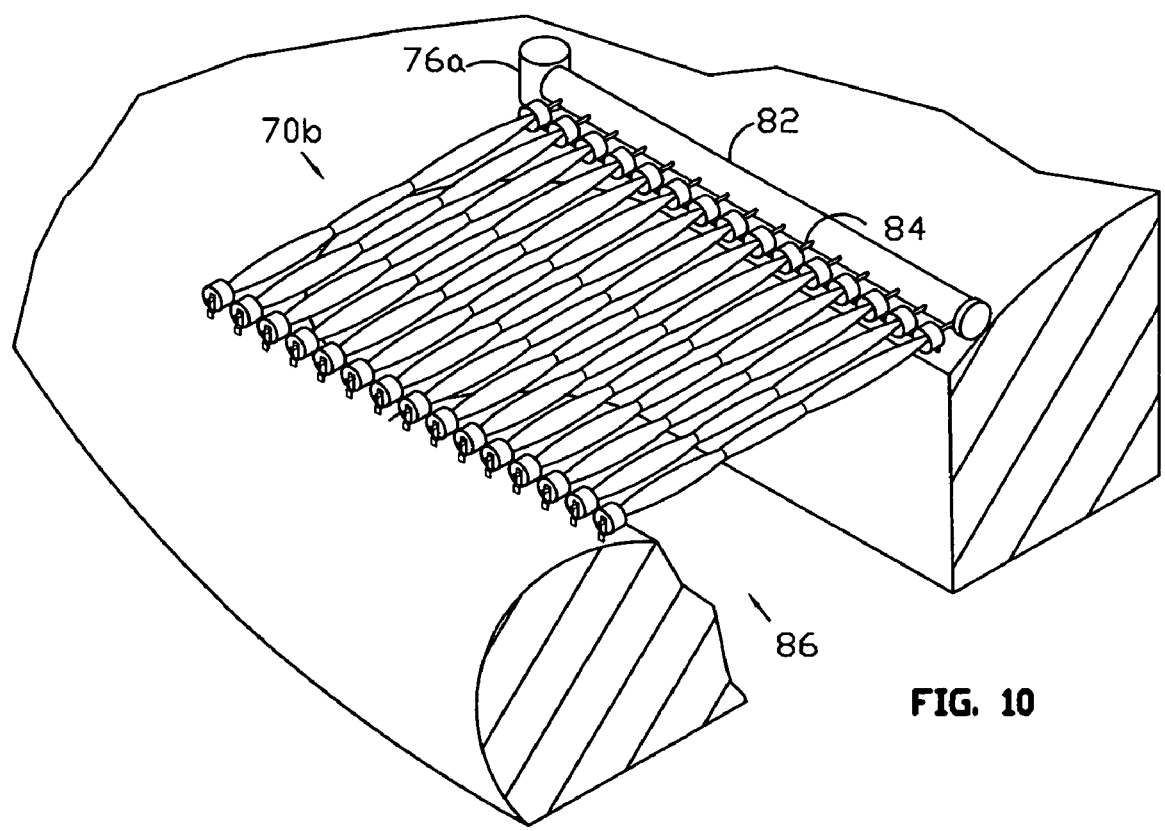
FIG. 10 shows a cross-section of a valley landscape covered by an assembly of modules to provide environment control on a large scale.

FIG. 10 illustrates how an assembly of the Tensioned Inflatable Cover Module can be installed over a valley landscape to provide a variable cover for environment control. For illustration purpose a group of modules in deflated state 70*b* is shown spanning an enclosed valley 86 to afford large scale control of the enclosed environment. Inflation means 76*a* are provided to convey a fluid, e.g. air, into and out of modules 70*b* via suitable main duct 82 and secondary duct 84 connections. The modules 70*b* span the width of the valley and are anchored into the high grounds directly by means of the anchors 40 or by fastening the anchors 40 onto other suitable support, e.g. posts, beams. Air exchange between the enclosed valley 86 and the surrounding atmosphere can be controlled by varying the size of the openings between modules of the assembly 70*b* and between modules of the assembly 70*b* and the ground. Size of the openings between modules in assembly 70*b* is in turn determined by inflation pressure, which can be controlled. It would be obvious to those skilled in the art that control of inflation pressure can be achieved by controlling inflation means 76*a* using appropriate electronic wares, e.g. thermostats, humidistats, solar panels coupled to proportional controllers, computers and the like. Whole cities or leisure resorts could be built under the cover of the Tensioned Inflatable Cover Module to benefit from the controlled environment. When a light-transmitting cover is used, the enclosed controlled environment is in effect also a giant greenhouse where the length, width and ceiling could be as high as the topography permits. The scale of the building could allow use of construction and agricultural machinery, vehicles, crafts, associated ware and the like.

Other Uses

The Tensioned Inflatable Cover Module can also be used as a light or radiation filter by inflating the invention with colored or particulate fluids or by fitting modules with appropriate reflectors, paints, dyes or simply by using light-restricting materials like fabric for the construction of the inflatable tube 24. The uses outlined above are given as examples only and are far from exhaustive.

Warnings

A cover provided by means of the Tensioned Inflatable Cover Module could be installed at great height and span; sound and safe engineering practice in design and erection of the modular cover is recommended to prevent damage, harm to property and life that could be caused by falling snapped support means or other components of the module. Periodic dumping of snow and rain may be required to prevent overload of modules and associated dangers. Installations of the Tensioned Inflatable Cover Module may require protection from wildlife, e.g. perching birds, climbing animals and other animals; established methods of wildlife and pest management may be considered. Grounding of outdoor installations is recommended to minimize damage and loss due to lightning strikes or other like discharges.

What is claimed is:

1. A tensioned inflatable cover module for buildings, greenhouses and shelters, comprising:
   an inflatable tube, for providing variable spatial cover;
   an elastic cincture, fox peripheral deflating and tensioning, elastically encircling to said inflatable tube;
   an open conduit slider, for movable end support, sealably embraced to said inflatable tube;
   an open conduit spring, for tensioning and deflating, moveably urged to said open conduit slider;
   a closed conduit slider, for movable end support, sealably embraced to said inflatable tube;
   an ends link, for coaxial strengthening and tensioning;
   a closed conduit, for fluid retention, securely connected to said ends link, and slidably embraced to said closed conduit slider;
   a closed conduit spring, for tensioning and deflating, freely retained to said closed conduit, and moveably urged to said closed conduit slider;
   an open conduit tension coupling, for fastening to a frame or ground support;
   a closed conduit tension coupling, for fastening to a frame or ground support, adjustably secured to said closed conduit; and
   an open conduit, for fluid transit, adjustably secured to said open conduit tension coupling, securely connected to said ends link, freely retained to said open conduit spring, and slidably embraced to said open conduit slider.

2. The tensioned inflatable cover module as recited in claim 1, wherein the ratio of the diameter of either said open conduit slider or of said closed conduit slider to the diameter of said inflatable tube is close to 1, in the fully deflated state, and decreases proportionately with increased inflation, thereby affording reversible control and variable inflation of said inflatable tube.

3. The tensioned inflatable cover module as recited in claim 1, further comprising:
   a closed conduit anchor, for grounding support, securely retained to said closed conduit, and supportively urged to said closed conduit tension coupling; and
   an open conduit anchor, for grounding support, supportively urged to said open conduit tension coupling, and securely retained to said open conduit.

4. A tensioned inflatable cover module for buildings, greenhouses and shelters, comprising:
   an open conduit and a closed conduit, for fluid transit and retention;
   an inflatable tube, for providing variable cover;
   an elastic cincture, for peripheral deflating and tensioning, elastically encircling to said inflatable tube;
   a pair of sliders, for movable end support, sealably secured to each end of said inflatable tube, and one of said pair slidably embraced to said open conduit and the other of said pair slidably embraced to said closed conduit;
   a pair of springs, for tensioning and deflating, cooperatively urged to said pair of sliders, and one of said springs freely retained to said open conduit and the other of said spring free retained to said closed conduit;
   a tensionable member, for coaxial strengthening and tensioning, securely linked to said open conduit and securely linked to said closed conduit; and
   a pair of tension coupling, for fastening, adjustably secured to said open conduit and adjustably secured to said closed conduit.

5. The tensioned inflatable cover module as recited in claim 4, further comprising:
   A pair of anchors, for grounding support, adjustably secured to said open conduit, supportively buttressed to said tension coupling and adjustably secured to said closed conduit, supportively buttressed to said tension coupling.

6. Method of building and operating an inflatable variable cover, particularly adapted for use as a controlled environment, provided by the module or an assembly thereof of claim 1 on framed structures, comprising the steps of:
   a. providing tubular framing members having a lumen and opposing apertures, said lumen being fluidly connected to said opposing apertures
   b. substantially sealing and fluidly connecting an open conduit and a closed conduit to said lumen through said opposing apertures
   c. adjusting tension of said module by fastening an open conduit tension coupling onto said open conduit and a closed conduit tension coupling onto said closed conduit, against said tubular framing members
   d. conveying fluids or fluidized substances at controlled, variable pressure, to and from said module or an assembly thereof through said tubular framing members.

7. Method of building and operating an inflatable variable cover, particularly adapted for use as a controlled environment, provided by the module or an assembly thereof of claim 3, on framed structures, comprising the steps of:
   a. fastening an open conduit anchor and a closed conduit anchor to opposing framing members
   b. securing an open conduit to said open conduit anchor and a closed conduit onto said closed conduit anchor
   c. adjusting tension of said module by fastening an open conduit tension coupling onto said open conduit and a closed conduit tension coupling to said closed conduit, against the face of said open conduit anchor and of said closed conduit anchor
   d. conveying fluids or fluidized substances at controlled, variable pressure to and from module or an assembly thereof.

8. Method of building and operating an inflatable variable cover, particularly adapted for use as a controlled environment, provided by the module or an assembly thereof of claim 3 to span ground depressions, valleys, canyons, craters, coulees, comprising the steps of:
   a. providing ground depressions of useful dimensions
   b. securely driving an open conduit anchor and a closed conduit anchor into the high grounds on opposite sides of said ground depressions
   c. Securing an open conduit to said open conduit anchor and a closed conduit to said closed conduit anchor
   d. adjusting tension of said module by fastening an open conduit tension coupling to said open conduit and a closed conduit tension coupling to said closed conduit, against the face of said open conduit anchor and of said closed conduit anchor
   e. conveying fluids or fluidized substances at controlled, variable pressure to and from said module or an assembly thereof.

* * * * *